Figure 1:
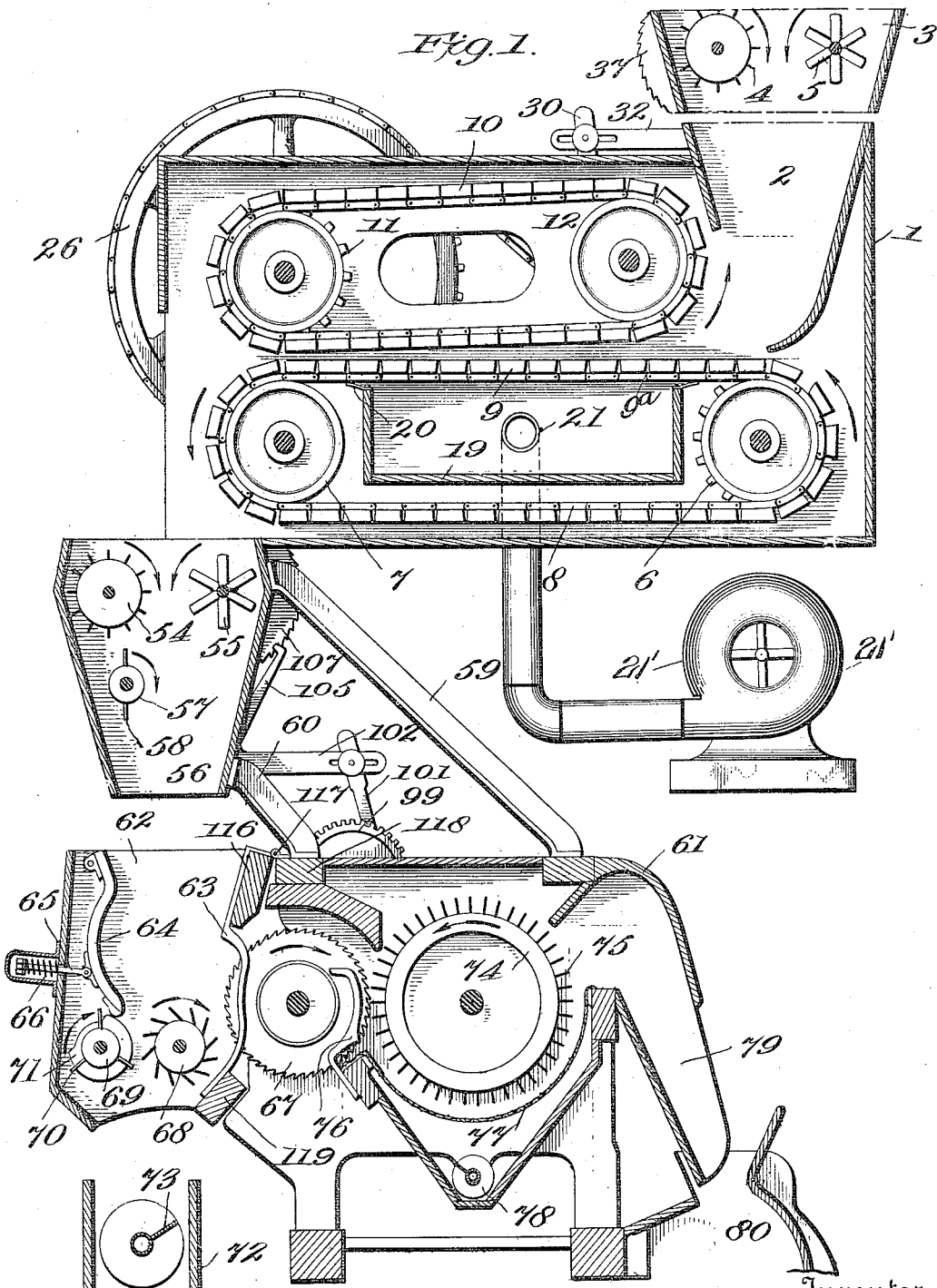

J. A. SHIELDS.
APPARATUS FOR TREATING SNAP BOLLS.
APPLICATION FILED MAR. 15, 1910.

994,609.

Patented June 6, 1911.

4 SHEETS—SHEET 1.

J. A. SHIELDS.
APPARATUS FOR TREATING SNAP BOLLS.
APPLICATION FILED MAR. 15, 1910.

994,609.

Patented June 6, 1911.

4 SHEETS—SHEET 2.

J. A. SHIELDS.
APPARATUS FOR TREATING SNAP BOLLS.
APPLICATION FILED MAR. 15, 1910.

994,609.

Patented June 6, 1911.

4 SHEETS—SHEET 3.

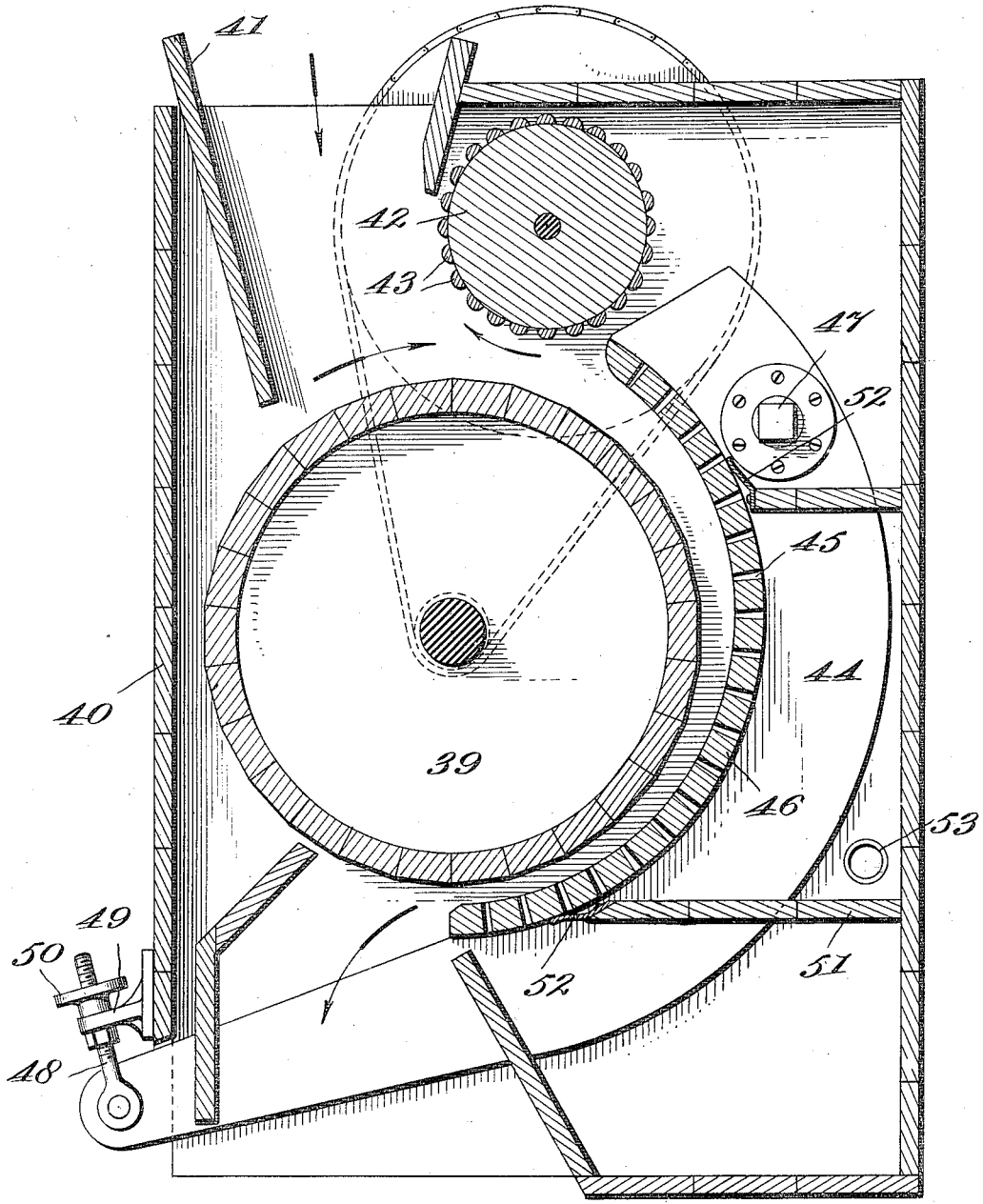

UNITED STATES PATENT OFFICE.

JAMES A. SHIELDS, OF ATLANTA, GEORGIA.

APPARATUS FOR TREATING SNAP-BOLLS.

994,609.

Specification of Letters Patent. Patented June 6, 1911.

Application filed March 15, 1910. Serial No. 549,422.

*To all whom it may concern:*

Be it known that I, JAMES A. SHIELDS, a citizen of the United States, residing at Atlanta, in the county of Fulton and State of Georgia, have invented certain new and useful Improvements in Apparatus for Treating Snap-Bolls; and I do hereby declare the following to be a full, clear, and exact description of the invention, such as will enable others skilled in the art to which it appertains to make and use the same.

My invention relates to improvements in treating snap bolls.

In cotton growing, the boll, as it is first formed, is filled with a fine pulp which afterward, as the boll ripens, changes into the cotton fiber, clinging to the seeds. Finally, after the boll has been thoroughly matured, it splits open, leaving the cotton exposed but clinging to the husk, from whence it is readily removed by the pickers. The bolls, however, become fully matured some little time, as a week or so, before they crack open, and if the frost strikes the bolls before or just at the time when they are beginning to crack, it paralyzes and stiffens the outer casing or husk of the bolls, so that they will not open and give up the fiber. Such frost bitten bolls are commonly called "snap bolls", and up to the present time have been an entire loss. In some localities, such as Oklahoma, North Texas, and Arkansas, it often happens that a very large proportion of the cotton crop is lost on account of frost, this loss sometimes amounting to about a third of the entire crop. Up to the present time, these snap bolls have been considered valueless. Notwithstanding this, however, they are full of mature cotton fiber, which is almost as good as if the boll had opened entirely. In these snap bolls, the fiber and seed have reached such a stage of maturity that they will attempt to break open the husk of a boll, but when this has been touched and paralyzed by the frost, they are unable to break it, and although these bolls contain a considerable amount of fairly good cotton, they have hitherto become worthless.

The object of my invention is to produce an apparatus by which these hitherto worthless snap bolls can be treated for the purpose of recovering the cotton therefrom. These bolls must go through a breaking or rolling operation to break the husk, a cleaning operation to separate the lighter trash therefrom, another cleaning operation to separate the husk from the seed cotton, and then another cleaning process in case any of the trash is left clinging to the cotton. The seed cotton is then fed to a gin of any approved or standard type.

With the objects stated in view, my invention consists in the construction and combinations of parts as hereinafter described and claimed.

Figure 2:
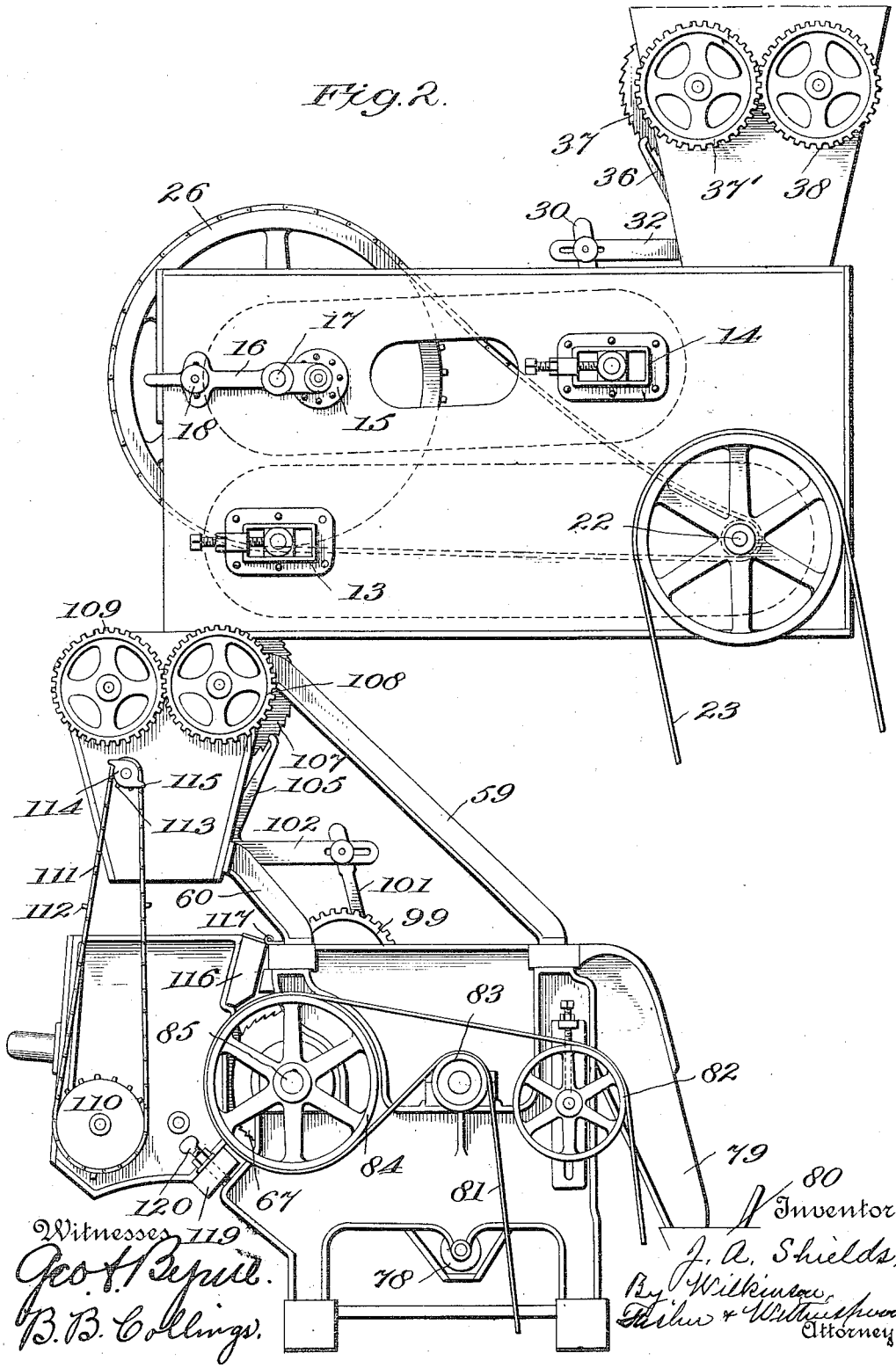
Figure 3:
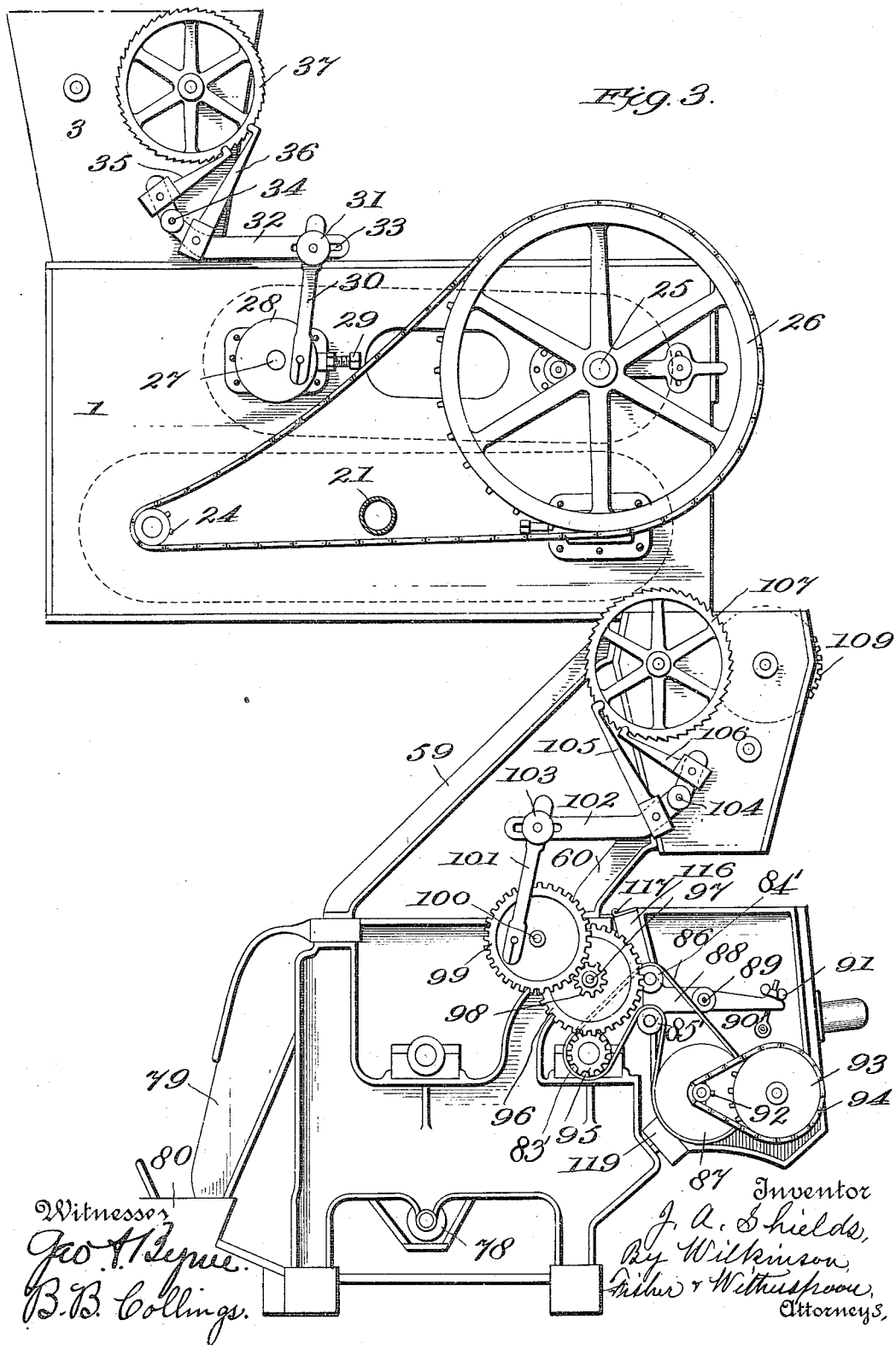

In the accompanying drawing—Figure 1 is a vertical cross-section of an apparatus for treating snap bolls. Fig. 2 is a side view thereof. Fig. 3 is a side view taken from the opposite side, and Fig. 4 is a cross-section of a modified form of the apparatus for rolling the bolls to break the husk.

The apparatus for rolling the bolls to break the husk is shown at the upper part of Fig. 1, and a modification thereof is shown in Fig. 4. It consists of a casing 1, provided with a hopper-shaped opening 2, above which is mounted a hopper 3, provided with a toothed feed roller 4 and a spiked roller 5 for feeding the bolls into the breaker or roller. In the bottom of the casing 1 are journaled two shafts, on which is mounted a sprocket wheel 6 and a roller 7, over which passes an endless apron 8. This is preferably made of blocks of wood 9 or of wood veneered with iron, attached to the links of a sprocket chain. These blocks of wood are not exactly rectangular, but are beveled off so as to leave tapered openings 9ª between them. Above this apron is another endless apron 10, similarly made, carried on a sprocket wheel 11 and roller 12. The endless apron 10 travels in the opposite direction from the endless apron 8, as shown in Fig. 1, the object being to roll the bolls over as they are carried along by the apron 8, thereby breaking the outer husk, but not crushing it too fine, as this would make it more difficult to separate the trash from the seed cotton. The roller 7 is mounted in adjustable bearings 13, and the roller 12 is mounted in adjustable bearings 14 for the purpose of taking up any slack in the aprons. The sprocket wheel 11 is mounted in a bearing 17, which is adjustable by means of a lever 16 upwardly or downwardly, to bring one end of the apron 10 nearer to or farther from the apron 8. The lever 16 is pivoted on a pin carried in a plate 15 on the frame, and is held in its adjusted position by means of a screw 18, passing into the casing and working through a slot in the lever 16. This adjustment is necessary, as the size of the snap bolls varies considerably in different parts of the country.

Within the apron 8 is mounted a casing 19, having rubber flaps 20, fitting closely against the under side of the apron 8. To this casing is connected a pipe 21, which in turn is connected to a suction fan 21', and by this means the fine dust and trash that is caused by the breaking of the bolls is drawn in between the blocks of the apron 8 and out of the machine.

The breaker or roller is driven by the following means: The shaft 22 of the sprocket wheel 6 is the main driving shaft, and over a pulley thereon runs a belt 23, connected to any suitable source of power. On the other end of the shaft 22 is mounted a sprocket wheel 24, and on the shaft 25 of the sprocket wheel 11 is mounted, outside of the casing, a large sprocket wheel 26, operated by the wheel 24 by means of a chain. On the shaft 27 of the roller 12 is mounted a disk 28, having on it a pin, which engages the end of an operating arm 30, which in turn is adjustably connected by means of a screw 31 to the bent lever 32, said screw 31 working in a slot 33 of said lever. This lever is pivoted on a pin or stud 34 on the hopper 3, and has connected to it two pawls 35 and 36, one on each side of said pivot point. These pawls alternately engage with the teeth of a wheel 37, which is fixed on the shaft of the toothed roller 4. The revolution of the toothed roller 4 also drives the spiked roller 5 by means of the gear wheels 37' and 38, geared together and mounted on the shafts of said rollers. Any other means for driving the breaker or roller could be used that would give the motion hereinbefore described. A modified form of this boll breaker or roller is shown in Fig. 4. It consists of a hollow drum 39, preferably made of wooden staves fitted together, as shown, and either veneered with roughened but not corrugated iron, or being roughened on the outside. This roller is mounted in a casing 40 and over it is the delivery chute 41. Above the roller 39 and a little to one side of it, is another roller 42, provided with ribs or blunt projections 43. The roller 42 revolves in the opposite direction from the roller 39 and serves to loosen up the masses of bolls as they are fed to the roller 39, and to prevent crowding thereof, this effect being also produced by the apron 10 in the form shown in Fig. 1. Around nearly one half of the roller 39 is a curved breast 44, composed of slats placed parallel to each other and having openings 45 between them, said openings being widest on the outside, as shown in Fig. 4. The slats 46 are made of wood roughened on the outside, or of wood veneered with roughened iron, and the whole breast is adjustably mounted on the rod 47, being fixed in its adjusted position by means of a rod 48, which is pivotally attached to the lower end of said breast, which rod works through a perforated bracket 49 and is secured in position by a screw 50. On the outside of the breast is formed a box 51, fitting closely against the back of the slats by means of leather or rubber straps 52, and in this box is fitted a pipe 53, which is connected to an exhaust fan not shown, this being for the purpose of sucking off the dust and trash, as already described in connection with Fig. 1.

After passing through the breaking apparatus and being delivered downward over the end of the apron 8, as indicated by the arrows in Fig. 1, the bolls and cotton form a bat, and special devices are needed to break this bat and prevent the machine from clogging. With ordinary cotton, the bat formed would break of itself, but when mixed with the hulls, special breaking apparatus is necessary. 54 represents a toothed roller and 55 a spiked roller, which revolve toward each other, as indicated by the arrows in Fig. 1, and feed the bat downward through the hopper 56. To break the bat as it passes, I have provided a roller 57, provided with two oppositely arranged rows of teeth 58. This roller is revolved by intermittently acting gear mechanism, and it operates very quickly and then stops, thus breaking the bat into pieces, which are operated upon by means hereinafter described. The hopper 56 is carried on a strong framework, parts of which are shown at 59 and 60, and this same framework supports the casing 1. The pieces of the bat, as they are successively broken off, drop into the separating apparatus, which consists of a casing 61, having an opening 62, through which the cotton drops down, a series of curved ribs 63 on one side of said opening, and a vibratory plate 64 on the other side of said opening. The plate 64 has attached to it a rod 65, and a spring 66, surrounding said rod, normally pulls the plate 64 outwardly toward the end of the casing.

Between the ribs 63 operate the saws 67. The ribs 63 are spaced far enough apart so that the cotton seed, with the cotton adhering thereto, can be easily carried between them; in other words, the ribs 63 and saws 67 act simply to clean the cotton or separate it from the hulls. It has been found by trial impracticable to gin the cotton by means of the saws 67 and ribs 63, as it is too great a tax upon the machine to clean the cotton and gin it at a single operation. The ribs 63, therefore, are set at a considerable distance apart, and the saws 67 are of special construction and very much heavier than the ordinary gin saw. The saws 67 have only five teeth to the inch, while the ordinary gin saw has ten or twelve teeth to the inch. The teeth on the saws 67 are therefore very much longer and stronger, and the saws themselves may, if desired, be made of thicker plates of steel, so that they are of ample strength to withstand the rough treatment that they encounter in attacking the bat containing the crushed bolls. The teeth on the saws 67 separate the seed cotton from the husks and pull it through the ribs 63.

I have found it necessary to devise special means for getting rid of the boll husks as they are separated from the seed cotton, and near the lower end of the ribs 63 I have provided a spiked roller 68, having inclined spikes thereon, which revolves toward the ribs 63. The spikes on the roller 68 are inclined and set close together, and this roller feeds the bat of cotton against the ribs 63. The saws 67 separate the seed cotton therein, and the husks rapidly collect in front of the ribs and above the roller 68. I have therefore made special provision for discharging these husks at intervals. I provide a roller 69, having on its outer surface three rows of teeth 70, spaced equally distant apart. The normal action of the teeth 70 is to force the broken husks down out of the machine, but the curved plate 64 ordinarily prevents the husks from being caught by the teeth 70. I therefore provide a cam 71 on the shaft of the roller 69, said cam having a recessed portion and bearing against the lower end of the plate 64. The cam 71 is so shaped that for about two-thirds of each revolution of the roller 69 the plate 64 is held in the position shown in Fig. 1. For about one-third of each revolution, the cam 71 releases the lower part of the plate 64, whereupon the spring 66 pulls said plate backward, allowing the husks to fall freely and to be caught by the teeth 70 on the roller 69, thus forcing them out of the machine. The husks and dirt fall into a trough 72, in which is a spiral conveyer 73. A few of the smaller pieces of the husks are carried over by the roller 68 and discharged at the lower end of the ribs 63, but the main portion is discharged by the teeth on the roller 69.

The seed cotton is carried along by the saws and is freed therefrom by a drum 74, having spikes 75 on its periphery. This drum 74 revolves considerably faster than the saws 67 and in the opposite direction, thus quickly pulling the cotton off the saws. In the drawing, I have shown a series of peculiarly curved ribs 76 between the saws, which aid in the pulling of the seed cotton off the saws, but they are not strictly necessary. The drum 74 sweeps the cotton over a coarse screen 77, having about three meshes to the inch, through which the fine trash falls and is carried off by the conveyer 78.

The seed cotton is then carried by the drum 74 up to the chute 79, from whence it is delivered to the mouth 80 of a gin. No means is required for separating the seed cotton from the roller 74, as the spikes 75 on said roller extend radially and the roller revolves at a considerable speed, so that the seed cotton is thrown off by centrifugal force. In some localities, where the amount of snap bolls is comparatively small, it would not pay to feed the seed cotton directly to a gin, as there is not enough of it. In such cases, it may be delivered into a bin until a sufficient quantity has been collected, at least fifteen hundred pounds, and then may be fed to the gin.

The plate 64 and the parts coöperating therewith can be applied directly to any huller gin now in use. With the present huller gin, it requires the attention of an attendant to aid in removing the husks, but by this construction the removal is effected automatically.

The means for driving the parts below the casing 1 will next be described: 81 represents the main driving belt from any suitable source of power. This belt passes over a tightener pulley 82, supported in adjustable bearings on the casing 61, and it also passes over a pulley 83 on the shaft of the drum 74, and over a larger pulley 84 on the shaft which carries the saws 67, thus causing the drum, as already described, to revolve considerably faster than the saws. On the saw shaft 85 is mounted a pulley 83', over which passes a belt 86, which belt also passes over a pulley 87 on the shaft of the roller 68. The belt 86 also passes over two tightener pulleys 84' and 85', carried by a lever 88, adjustably supported on a stub shaft 89 and adjusted by means of the rod 90 and the set screw 91. On the shaft carrying the pulley 87 is mounted a sprocket pinion 92, and on the shaft of the roller 69 is mounted a sprocket wheel 93, a sprocket chain 94 connecting these two sprocket wheels, so that the roller 69 is driven by the rotation of the roller 68. On the saw shaft 85 is also mounted a small pinion 95, which meshes with a pinion 96, carried on a stub shaft 97, mounted on the casing 61. This stub shaft 97 also carries a small gear pinion 98, meshing with a gear wheel 99 on a stub shaft 100. This gear wheel carries upon it a pinion, which engages one end of the link 101, adjustably secured to a vibratory lever 102 by means of a slot in said lever and a set screw 103. The lever 102 is bent and pivoted on a stub shaft 104 on the hopper 56, and it carries two pawls 105 and 106, which mesh with a toothed wheel 107 on the shaft of the spiked roller 55. On the other end of this shaft is mounted a gear wheel 108, which meshes with a gear wheel 109 on the shaft of the roller 54. On one end of the shaft carrying the roller 69 is mounted a sprocket wheel 110, over which passes a sprocket chain 111, having projecting teeth 112 at intervals thereon. The sprocket chain passes over a sprocket wheel 113, which is loosely mounted on the shaft of the roller 57. To the shaft of this roller is fixed a pinion 114, having two teeth 115 thereon, oppositely located with respect to each other and arranged to be struck, at intervals, by the teeth 112 of the sprocket chain 111, the result being that the roller 57 is revolved quickly at intervals just one-half of a revolution. The ribs 63 are parallel to each other and fastened at their upper ends to a bar 116, attached by hinges such as 117 to a crosspiece 118 of the casing 61. The lower end of these ribs is attached to a bar 119, which bar is adjustably held in the casing by means of screws 120, so that the ribs 63 may be adjusted relatively to the saws 67.

I have actually gone over cotton fields that have been abandoned by farmers who assumed that all the cotton worth saving had been gathered therefrom, and have collected from 250 to 350 pounds per acre of snap cotton bolls, which in turn have produced from 50 to 75 pounds per acre of lint cotton, which is a clear saving. In some localities, such as North Texas, parts of Arkansas and Oklahoma, the saving is considerably larger, amounting in many instances to practically one-third of the cotton crop. Oklahoma has a rich soil admirably adapted for producing cotton, but its elevation is high and it is therefore more subject to early frosts than other localities. Although the climate of Oklahoma is thoroughly adapted for cotton raising, the first frost is apt to come very suddenly, catching a large percentage of the cotton crop, which percentage was formerly considered ruined, but which by my process and apparatus is saved.

In cotton picking, it is customary to separate the cotton from the bolls, and this requires skilled or partly skilled labor. To gather the snap bolls, however, requires only unskilled labor, so that the saving of the snap bolls, hitherto considered useless, is attended with comparatively small expense.

In an ordinary seed cotton huller gin, two sets of ribs are provided, the lower one of which is straight and extends a comparatively short distance over the surface of the saws, the object being to separate the bolls from the seed cotton, and the other set of ribs is used for the purpose of separating the fiber from the seed as the saws operate between said ribs. By this construction, however, although the bolls are to a certain extent gotten rid of, the dirt and trash inevitably mix with the cotton fiber, as there is no chance for it to escape, rendering a special cleaning operation necessary. By my process and apparatus, however, this separation is effectually accomplished and the seed cotton is delivered to the gin perfectly clean. By the use of my apparatus, also, the cotton bolls, even when fully open, can be picked as a whole without separating the cotton therefrom, thus dispensing with the necessity for skilled pickers. In such a case, the bolls would be fed directly to that part of the apparatus shown at the bottom of Fig. 1, and it would not be necessary to run them through the crusher shown in the casing 1, in which crusher or breaker the snap bolls, which are tough, are merely rolled over and the husks broken, the arrangement being such that the husks are not disintegrated to any great extent. Any kind of a chute or pneumatic conveyer, not shown, can be applied to the top of the apparatus.

While I have thus described my apparatus, I wish it to be distinctly understood that I do not limit myself to the exact construction shown and described, as many variations therefrom could be used, provided that the snap bolls should first go through a breaking or rolling operation to break the husk, a cleaning operation to separate the lighter trash, another cleaning operation to separate the broken boll husks from the seed cotton, and another cleaning process in case any trash is carried along with the seed cotton, the cotton being then ginned in the usual way.

I claim:—

1. In an apparatus of the character described, the combination of means for rolling snap bolls to break the husks and form a bat, means for breaking said bat into parts, and means for separating the seed cotton from the husks, substantially as described.

2. In an apparatus of the character described, the combination of means for breaking snap bolls by rolling them over between two surfaces, one of which is movable with relation to the other, thereby breaking the bolls and forming a bat, means for breaking said bat into parts, means for separating the husks and the seed cotton from said parts, and means for cleaning the seed cotton, substantially as described.

3. In an apparatus of the character described, the combination of means for rolling snap bolls over between relatively movable surfaces, so as to break the husks and form a bat, pneumatic means for withdrawing the fine dust and trash, means for breaking the bat into parts, means for separating the seed cotton and the husks from said parts, said means including intermittently acting devices for discharging the husks at intervals, and means for cleaning the seed cotton, substantially as described.

4. In an apparatus of the character described, the combination of means for breaking snap bolls and forming a bat therefrom, including a traveling apron adapted to carry the bolls from the receiving end to the discharging end, a pneumatic suction device, arranged in proximity to said apron, and a second apron arranged at an angle to said first named apron and traveling in the opposite direction, whereby the bolls are rolled over and over in a constantly narrowing space between said aprons and formed into a bat, substantially as described.

5. In an apparatus of the character described, the combination of a casing, an apron movably mounted therein, composed of slats, the openings between said slats being largest toward the inside of the apron, a suction box provided with air excluding flaps fitting up against the under side of said apron and connected with suction devices, a second apron arranged at an angle to said first named apron and adapted to travel in the opposite direction, said aprons being closer together at the discharge end than at the entrance end, and means for adjusting one of said aprons relatively to the other to vary the space between them, substantially as described.

6. In an apparatus of the character described, the combination of means for breaking snap bolls and making a bat from the broken bolls, and devices for breaking said bat into parts, said devices including constantly revolving toothed rollers, revolving in opposite directions, and between which the bat is drawn, an intermittently acting toothed roller, and mechanism for revolving said roller one-half of a revolution at intervals, substantially as described.

7. In an apparatus of the character described, the combination of means for separating the seed cotton from the bolls, consisting of a spiked roller, a toothed roller, a vibratory plate automatically operated as said toothed roller revolves, allowing the husks to be discharged freely at intervals, and means for vibrating said plate, substantially as described.

8. In an apparatus of the character described, the combination of a casing, a series of ribs adjustably mounted in said casing, said ribs being located parallel to each other and far enough apart to permit seed cotton to pass between them, a series of saws working in the spaces between said ribs, a spiked roller for throwing seed cotton mixed with boll husks against said saws and ribs, and intermittently acting discharge means for the boll husks as they collect, including a vibratory plate and means for operating it, substantially as described.

9. In an apparatus of the character described, the combination of means for separating cotton from the husks, devices for throwing the material under treatment against said separating means, and means for discharging the collected husks at intervals, including a toothed roller and a vibratory plate governed by the movement of said roller, whereby said plate is swung back at intervals to permit the collected husks to be freely discharged, substantially as described.

10. In an apparatus of the character described, the combination of means for separating cotton from the boll husks, devices for throwing the material under treatment against said separating means, and means for discharging, at intervals, the boll husks as they collect, said means including a spiked roller provided with a cam, a vibratory plate in contact with said cam, and spring-operated devices for holding said plate against said cam, substantially as described.

11. In an apparatus of the character described, the combination of a casing, a series of ribs adjustably mounted in said casing, a series of saws working between said ribs, a spiked roller for throwing the material under treatment against said saws and ribs, a vibratory plate pivoted to the casing near its top, spring-operated means normally tending to pull the lower part of said plate toward the casing, and a toothed roller provided with a cam, bearing against the lower part of said vibratory plate, substantially as described.

12. In an apparatus of the character described, the combination of a casing, a series of parallel ribs adjustably mounted in said casing, a series of saws working between said ribs, a spiked roller for throwing the material under treatment against said saws and ribs, a vibratory plate for allowing the collected husks to be discharged freely at intervals, means for vibrating said plate, a device for pulling the cotton off of said saws, and a screen over which said cotton is carried by said last named devices, substantially as described.

13. In an apparatus of the character described, the combination of a casing, a series of ribs adjustably mounted in said casing, a series of saws working between said ribs, a spiked roller for throwing the material under treatment against said ribs and saws, a vibratory plate, spring-operated means for normally drawing said plate away from said ribs, a toothed roller provided with a cam, engaging said plate, a spiked drum adapted to withdraw the cotton from said saws, and a screen over which said drum carries said cotton after it has been withdrawn from said saws, substantially as described.

14. In an apparatus of the character described, the combination of a casing, a series of parallel ribs adjustably mounted therein, a series of saws working between said ribs, a spiked roller for throwing the material under treatment against said ribs and saws, a vibratory plate arranged opposite to said ribs and saws, spring-pressed means normally operating to draw said plate away from said ribs, a toothed roller provided with a cam, engaging one end of said vibratory plate, separating ribs between which said saws work, a toothed drum operating in connection with said separating ribs to withdraw the cotton from said saws, and a screen over which said toothed drum sweeps the separated cotton, substantially as described.

15. In an apparatus of the character described, the combination of a casing, a series of ribs adjustably mounted therein, parallel to each other, a series of saws, working between said ribs, a spiked roller adapted to throw the material under treatment against said ribs and saws, a vibratory plate located opposite to said ribs and saws, spring-pressed means normally tending to pull said plate away from said ribs and saws, a toothed roller provided with a cam, engaging said plate, a series of doffing ribs between which said saws work, a spiked drum, coöperating with said doffing ribs to remove the cotton from said saws, a screen over which said drum carries said cotton, and means for operating the revolving parts, said means being so arranged as to operate the spiked doffing drum faster than the saws, and to operate the spiked roller faster than the toothed delivery roller, substantially as described.

16. In an apparatus of the character described, the combination of a casing, parallel ribs mounted therein and separated from each other by spaces large enough to permit seed cotton to pass therebetween, saws working in the spaces between said ribs, a spiked roller for throwing the material under treatment against said saws and ribs, means for doffing the seed cotton from said saws, devices for permitting the discharge of the husks at intervals, including a toothed roller and a vibratory plate controlled by the action of said roller, devices for feeding a bat, composed of broken bolls and cotton, upon said spiked roller, means for breaking said bat into parts, at intervals, and means for operating the rotary parts mentioned, said means being adapted to operate the spiked doffing drum faster than the saws, the spiked feeding roller faster than the discharge roller, and for operating the bat-breaking means very quickly, at intervals, a half a revolution each time, substantially as described.

17. In an apparatus of the character described, the combination of means for breaking up snap bolls and forming them into a bat, intermittently operating means for breaking the bat into parts, means for separating the seed cotton from the husks in said parts broken from the bat, including a casing, a series of parallel ribs adjustably mounted therein and separated by spaces large enough to allow seed cotton to pass therebetween, a series of saws working between said ribs, a spiked roller adapted to throw said material against said saws and ribs, devices for discharging at intervals the husks as they collect, including a toothed roller, a vibratory plate, spring-operated means normally tending to draw said plate away from said ribs, said roller being provided with a cam contacting with each end of said plate, a spiked drum for doffing the cotton from said saws, and a screen over which said drum sweeps said doffed cotton, substantially as described.

In testimony whereof, I affix my signature, in presence of two witnesses.

JAMES A. SHIELDS.

Witnesses:
EDGAR WATKINS,
W. CARROLL LATIMER.